US012669670B2

(12) United States Patent
Yamamoto et al.

(10) Patent No.: US 12,669,670 B2
(45) Date of Patent: Jun. 30, 2026

(54) OBJECTIVE AND METHOD OF ASSEMBLING OBJECTIVE

(71) Applicant: Evident Corporation, Tatsuno-machi (JP)

(72) Inventors: Asuka Yamamoto, Tokyo (JP); Daiki Horiba, Kanagawa (JP); Zheng Li, Tokyo (JP); Hideto Yamashita, Nagano (JP)

(73) Assignee: Evident Corporation, Kamina-Gun (JP)

( * ) Notice: Subject to any disclaimer, the term of this patent is extended or adjusted under 35 U.S.C. 154(b) by 430 days.

(21) Appl. No.: 18/136,813

(22) Filed: Apr. 19, 2023

(65) Prior Publication Data

US 2023/0341648 A1    Oct. 26, 2023

(30) Foreign Application Priority Data

Apr. 26, 2022    (JP) .................................. 2022-072231

(51) Int. Cl.
G02B 7/02        (2021.01)
G02B 21/02       (2006.01)

(52) U.S. Cl.
CPC .............. G02B 7/021 (2013.01); G02B 21/02 (2013.01)

(58) Field of Classification Search
None
See application file for complete search history.

(56) References Cited

U.S. PATENT DOCUMENTS

| | | | |
|---|---|---|---|
| 8,233,226 B2 | 7/2012 | Sukigara et al. | |
| 2010/0140459 A1 | 6/2010 | Tatsuzawa et al. | |
| 2011/0063739 A1* | 3/2011 | Hirata .................... | G02B 7/023 |
| | | | 359/819 |
| 2012/0314122 A1* | 12/2012 | Yamashita ........... | G02B 13/004 |
| | | | 359/570 |
| 2016/0223829 A1* | 8/2016 | Nagayama ............. | G02B 27/62 |
| 2019/0324259 A1 | 10/2019 | Abe et al. | |
| 2020/0142151 A1* | 5/2020 | Kitagawa ............... | G02B 7/023 |

FOREIGN PATENT DOCUMENTS

| | | | | |
|---|---|---|---|---|
| CN | 101750704 A | * | 6/2010 | .......... G02B 13/005 |
| CN | 103809261 A | * | 5/2014 | .............. G02B 7/02 |
| CN | 107272185 A | * | 10/2017 | .......... G02B 25/002 |
| JP | 2006184485 A | | 7/2006 | |

(Continued)

OTHER PUBLICATIONS

Japanese Office Action (and an English language translation thereof) dated Jan. 27, 2026, issued in corresponding Japanese Application No. 2022-072231.

*Primary Examiner* — Michael H Caley

(74) *Attorney, Agent, or Firm* — Holtz, Holtz & Volek PC

(57) ABSTRACT

An objective includes: an objective barrel; a plurality of lens sub-assemblies stacked in an optical axis direction of the objective in the objective barrel, each of the plurality of lens sub-assemblies including a lens and a lens frame holding the lens; and a screw member screwed into the objective barrel, the screw member pressing the plurality of lens sub-assemblies against the objective barrel along the optical axis direction of the objective. The screw member has three or more concave portions into which a jig is fitted when the screw member is screwed into the objective barrel.

16 Claims, 9 Drawing Sheets

(56)    References Cited

FOREIGN PATENT DOCUMENTS

| | | | |
|---|---|---|---|
| JP | 2010060936 | A | 3/2010 |
| JP | 2010139626 | A | 6/2010 |
| JP | 2017173744 | A | 9/2017 |
| JP | 2019191274 | A | 10/2019 |
| JP | 2020071411 | A | 5/2020 |
| JP | 2021015238 | A | 2/2021 |
| JP | 2021140043 | A | 9/2021 |
| WO | 2009125640 | A1 | 10/2009 |

* cited by examiner

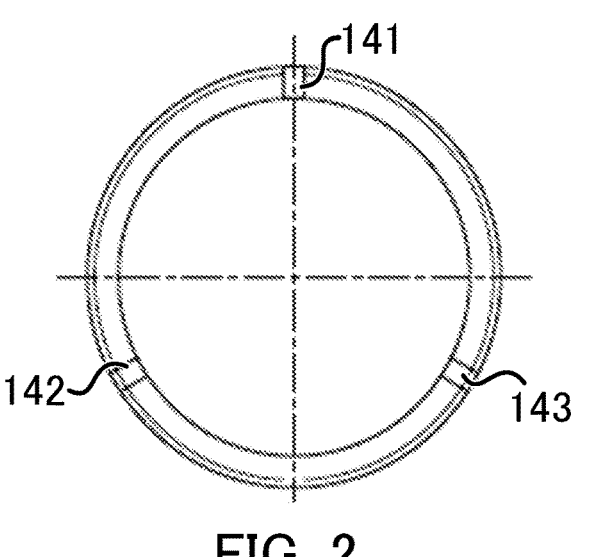
FIG. 2
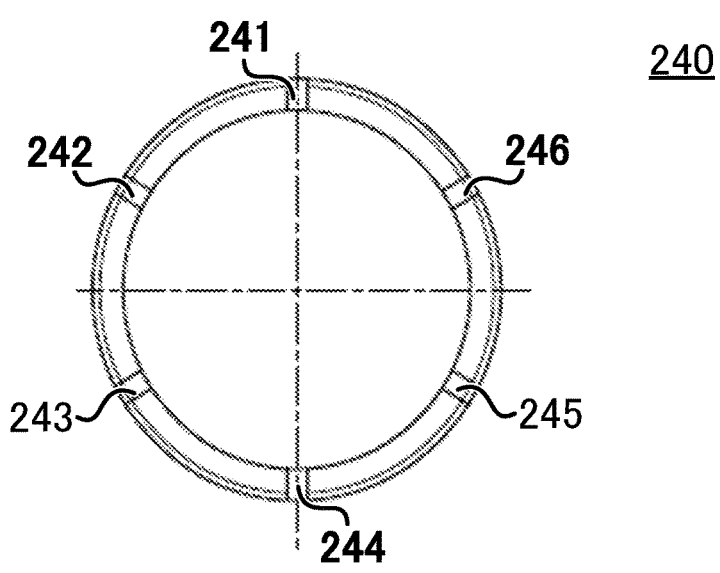
FIG. 3
FIG. 4

700

OBJECTIVE AND METHOD OF ASSEMBLING OBJECTIVE

CROSS REFERENCE TO RELATED APPLICATIONS

This application is based upon and claims the benefit of priority from prior Japanese Patent Applications No. 2022-072231, filed Apr. 26, 2022, the entire contents of which are incorporated herein by this reference.

BACKGROUND OF THE INVENTION

Field of the Invention

The disclosure herein relates to an objective and a method of assembling an objective.

Description of the Related Art

In an objective, a large number of lenses are housed in a tubular objective barrel. As a method of holding the lens in the objective barrel, in many cases, a mode is adopted in which a plurality of lens frames is disposed such that end surfaces of the plurality of lens frames to which the lens is fixed are in contact with each other, and a force is applied to the plurality of lens frames from both sides in a thrust direction.

The force applied in the thrust direction is generally generated by screwing a screw member called a presser ring into a screw thread formed on the objective barrel and pressing the lens frame in the thrust direction by the presser ring. Such a lens holding method is described in, for example, JP 2010-060936 A. According to this method, it is possible to suppress uneven contact between the end surfaces of the lens frames to appropriately maintain the lens interval, and to generate a sufficient frictional force between the end surfaces of the lens frames to suppress movement of the lenses in the radial direction.

SUMMARY OF THE INVENTION

An objective according to an aspect of the present invention includes: an objective barrel; a plurality of lens sub-assemblies stacked in an optical axis direction of the objective in the objective barrel, each of the plurality of lens sub-assemblies including a lens and a lens frame holding the lens; and a screw member screwed into the objective barrel, the screw member pressing the plurality of lens sub-assemblies against the objective barrel along the optical axis direction of the objective. The screw member has three or more concave portions into which a jig is fitted when the screw member is screwed into the objective barrel.

BRIEF DESCRIPTION OF THE DRAWINGS

The present invention will be more apparent from the following detailed description when the accompanying drawings are referenced.

FIG. 2 is a front view of a presser ring included in the objective illustrated in FIG. 1;

FIG. 3 is a diagram for explaining a configuration of a jig for attaching the presser ring illustrated in FIG. 2 to the objective;

FIG. 4 is a front view of a presser ring included in an objective according to a second embodiment;

DETAILED DESCRIPTION OF THE PREFERRED EMBODIMENTS

In the objective of the related art, a presser ring is screwed into an objective barrel by fitting a jig into concave portions at two positions called a crab-eye hole or a slot provided in the presser ring and rotating the jig. When the presser ring is screwed, a pressure in the thrust direction is concentrated on the concave portion, so that the presser ring may be deformed into a rotationally asymmetric shape.

Such deformation of the presser ring causes deformation of a lens frame, and the deformation affects the lens held by the lens frame. As a result, the optical performance of the objective is deteriorated, for example, the aberration is increased by the deformation of the lens together with the lens frame, or the polarization characteristic is deteriorated by the increase of the stress birefringence of the lens. Note that such performance degradation is particularly likely to occur in a case where a large number of lenses having a thin edge thickness or a thin middle thickness are used in order to achieve compactness and high optical performance.

First Embodiment

Figure 1:
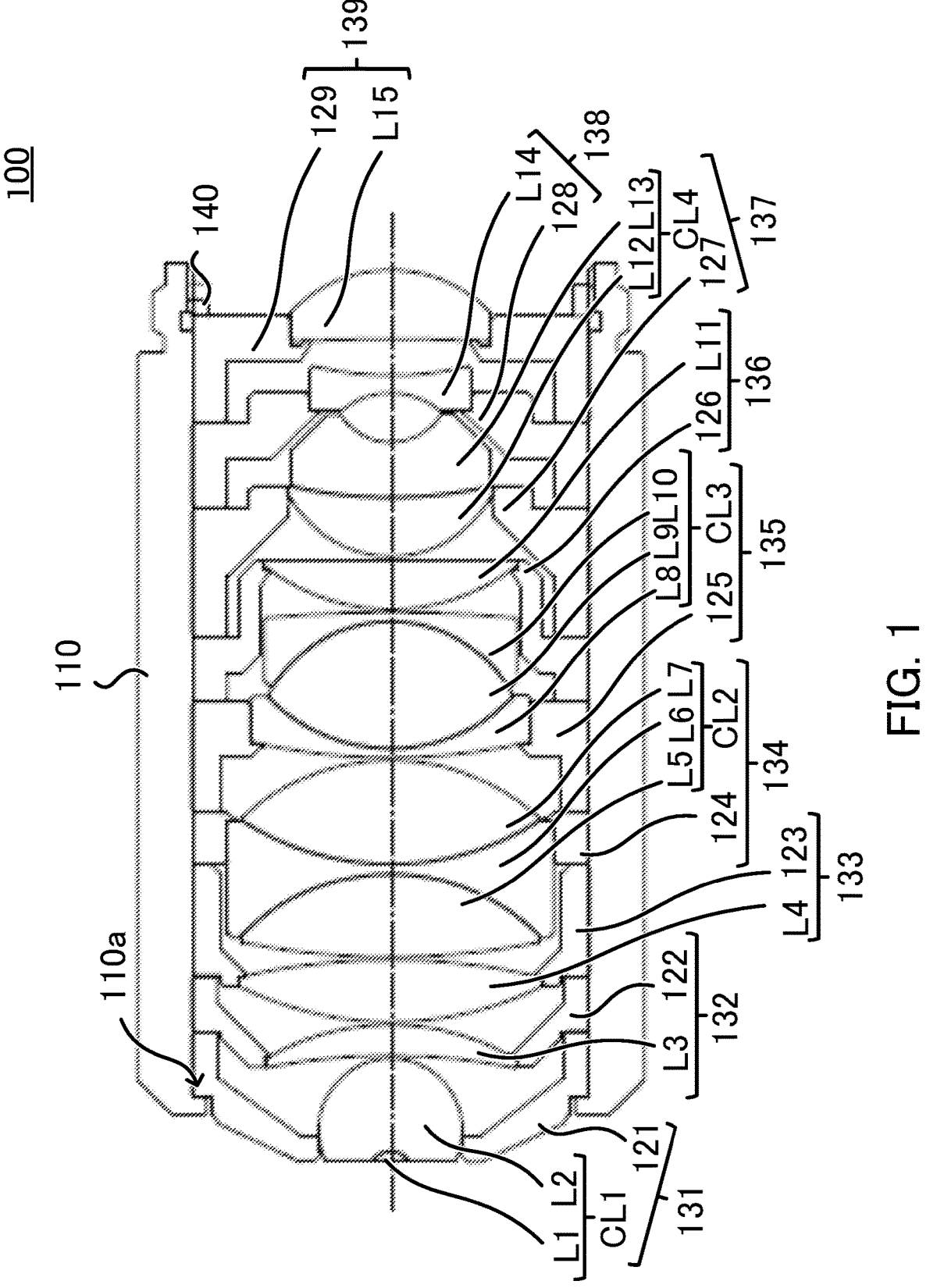
FIG. 1 is a cross-sectional view of an objective according to a first embodiment.

FIG. 1 is a cross-sectional view of an objective 100 according to the present embodiment. FIG. 2 is a front view of a presser ring 140 included in the objective 100 illustrated in FIG. 1. FIG. 3 is a diagram for explaining a configuration of a jig 10 for attaching the presser ring 140 illustrated in FIG. 2 to the objective 100. Note that FIG. 1 illustrates a cross-section of the objective 100 in a plane along the optical axis of the objective 100. The objective 100 illustrated in FIG. 1 is an objective for a microscope, and is not particularly limited, but is, for example, an infinity-corrected objective lens that forms an enlarged image of a sample in combination with an imaging lens. The objective 100 according to the present embodiment will be described below with reference to FIGS. 1 to 3.

As illustrated in FIG. 1, the objective 100 includes an objective barrel 110, a plurality of lens sub-assemblies (a lens sub-assembly 131, a lens sub-assembly 132, a lens sub-assembly 133, a lens sub-assembly 134, a lens sub-assembly 135, a lens sub-assembly 136, a lens sub-assembly 137, a lens sub-assembly 138, and a lens sub-assembly 139), and the presser ring 140.

The objective barrel 110 is a tubular member having a cylindrical shape, and houses a plurality of lens sub-assemblies therein. The direction along the central axis of the cylindrical objective barrel 110 (hereinafter simply referred to as the axial direction of the objective barrel 110) substantially coincides with the optical axis direction of the objective 100. The material of the objective barrel 110 is not particularly limited, but is brass, for example. The objective barrel 110 has, on an outer side surface thereof, a screwing portion 111 formed of a screw thread. The objective 100 is fixed to a microscope by screwing the screwing portion 111 to the revolver of the microscope. Note that the method of connecting the objective 100 and the microscope is not limited to screwing, and other methods may be used.

Each lens sub-assembly includes lenses (a cemented lens CL1 including a lens L1 and a lens L2, a lens L3, a lens L4, a cemented lens CL2 including a lens L5, a lens L6 and a lens L7, a cemented lens CL3 including a lens L8, a lens L9 and a lens L10, a lens L11, and a cemented lens CL4 including a lens L12 and a lens L13, a lens L14, a lens L15), and lens frames (a lens frame 121, a lens frame 122, a lens frame 123, a lens frame 124, a lens frame 125, a lens frame 126, a lens frame 127, a lens frame 128, and a lens frame 129) that holds the lenses.

The material of the lens is not particularly limited, but is, for example, optical glass. The lens frame has an annular shape and is fitted to the objective barrel 110 by being inserted into the objective barrel 110 along the inner side surface of the objective barrel 110. The material of the lens frame is not particularly limited, but is, for example, brass. The lens and the lens frame are bonded to each other by an adhesive not illustrated. Note that the lens included in each lens sub-assembly may be, for example, a single lens such as the lens L3, or may be a lens in which a plurality of lenses (lens L1 and lens L2) is cemented, such as the cemented lens CL1. Note that a single lens refers to a lens that is disposed in an optical system without being cemented to another lens.

The plurality of lens sub-assemblies is stacked and disposed in the objective barrel 110 in the axial direction of the objective barrel 110, that is, the optical axis direction of the objective 100, and is fixed in the objective barrel 110 by the presser ring 140. More specifically, a plurality of lens frames included in the plurality of lens sub-assemblies is in contact with each other at their end surfaces, whereby the plurality of lens sub-assemblies is stacked and disposed in the optical axis direction.

The presser ring 140 is a screw member screwed into the objective barrel 110. The material of the presser ring 140 is not particularly limited, but is brass, for example. The presser ring 140 is screwed into a screw thread formed on the inner side surface of the objective barrel 110, thereby pressing the plurality of lens sub-assemblies against the objective barrel 110 (more specifically, an abutment surface 110*a* formed in the vicinity of the object-side end portion of the objective barrel 110 and facing the image side) along the optical axis direction of the objective 100. When the presser ring 140 screwed into the objective barrel 110 presses the plurality of lens sub-assemblies (more specifically, the plurality of lens frames), the plurality of lens sub-assemblies is sandwiched between the presser ring 140 and the abutment surface 110*a*, so that the plurality of lens sub-assemblies is firmly fixed in the objective barrel 110.

As described above, in the objective 100, the plurality of lens sub-assemblies is pressed in the optical axis direction by the presser ring 140 so that no gap is formed between the plurality of lens sub-assemblies, and thus is sandwiched and fixed between the presser ring 140 and the objective barrel 110. Therefore, in order to fix the lens sub-assembly in the objective barrel 110, the presser ring 140 needs to be firmly screwed into the objective barrel 110 in the assembly process of the objective 100.

In the assembly work of the objective 100, the presser ring 140 is inserted into the objective barrel 110 along the optical axis direction of the objective 100 (in this example, from the image side), so that the outer peripheral portion of the presser ring 140 is covered with the inner side surface of the objective barrel 110. Therefore, the jig used for screwing the presser ring 140 into the objective barrel 110 has to apply a force in the thrust direction by acting on the presser ring 140 whose outer peripheral portion is covered with the objective barrel 110 from a direction along the optical axis direction and applying a torque to the presser ring 140.

Figure 12:
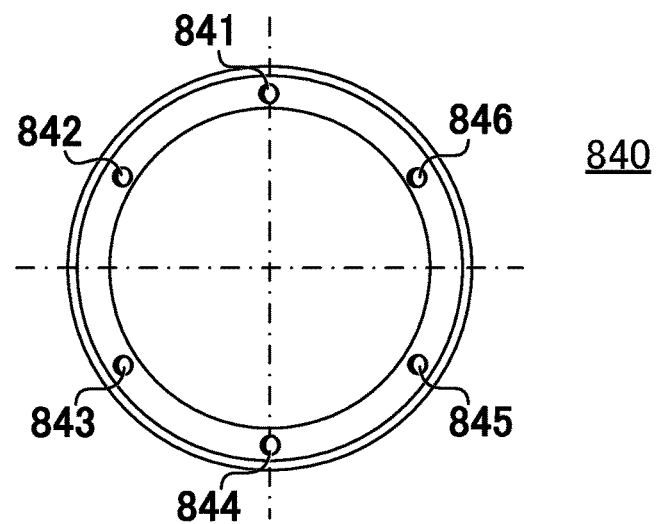
FIG. 12 is a front view of a presser ring included in an objective according to an eighth embodiment.
Figure 13:
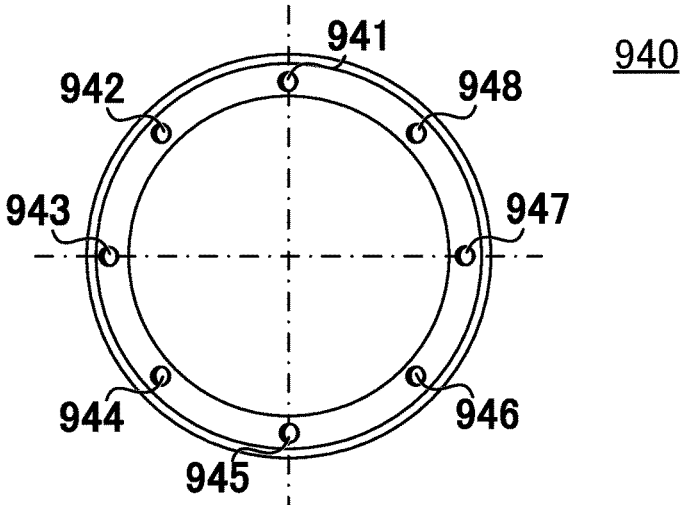
FIG. 13 is a front view of a presser ring included in an objective according to a ninth embodiment.

In a conventional objective lens, a force in a thrust direction is applied by providing concave portions at two positions of an end surface of a presser ring on a side exposed from the objective, inserting a tip of a jig into the concave portions at the two positions, and applying a torque to the presser ring. Note that when the concave portions at the two positions are holes as illustrated in FIGS. 12 and 13, which will be described below, the holes are called crab-eye holes because the holes resemble the eyes of a crab, and a jig for inserting the tip into the concave portions is called a crab-eye jig.

However, the inventors of the present application have found that, in a conventional method of applying torque to the presser ring with the concave portions at the two positions as fulcrums using a jig such as a crab-eye jig, large stresses are concentrated in the vicinity of the concave portions, and the presser ring is deformed. More specifically, the inventors have found that two protrusions are formed on the end surface of the presser ring opposite to the end surface provided with the concave portion. Note that this is not limited to the case where the concave portions at the two positions are the crab-eye holes described above, and the same applies to the case where the concave portions at the two positions are slots described below. Such deformation of the presser ring causes deformation of the lens frame, deformation of the lens, and excessive stress on the lens, and eventually deteriorates the optical performance of the objective.

Therefore, in the objective 100 according to the present embodiment, the configuration of the presser ring 140 is devised. Specifically, as illustrated in FIG. 2, the presser ring 140 is formed with three concave portions (a concave portion 141, a concave portion 142, and a concave portion 143) into which the jig 10 is fitted when the presser ring is screwed into the objective barrel 110, on an end surface in the axial direction. More specifically, the presser ring 140 has an annular shape, and the three concave portions are provided at equal intervals in the circumferential direction of the presser ring 140 having an annular shape. In other words, the presser ring 140 is formed with the three concave portions in directions different from each other by 120 degrees. Note that the concave portion is a minus-shaped slit called a slot.

In the objective 100 configured as described above, the jig 10 having three protrusions (a protrusion 11, a protrusion 12, and a protrusion 13) as illustrated in FIG. 3 is used when the presser ring 140 is screwed. Specifically, the three protrusions of the jig 10 are fitted into the three concave portions of the presser ring 140, and then torque is applied to the presser ring 140 by rotating the jig 10. Thus, the torque is applied to three fulcrums (three concave portions) in a dispersed manner, so that it is possible to suppress the deformation of the presser ring 140 caused by application of excessive torque to each point. Since the pressure applied in the thrust direction at the same time as the torque is also dispersed to three points, it is also possible to suppress the deformation of the presser ring 140 caused by the pressure in the thrust direction. Therefore, according to the objective 100, it is possible to suppress the deformation of the presser ring 140 in the assembly process, and it is possible to suppress the deterioration of the optical performance of the objective 100 due to the stress concentration when the presser ring 140 is screwed.

Second Embodiment

Figure 5:
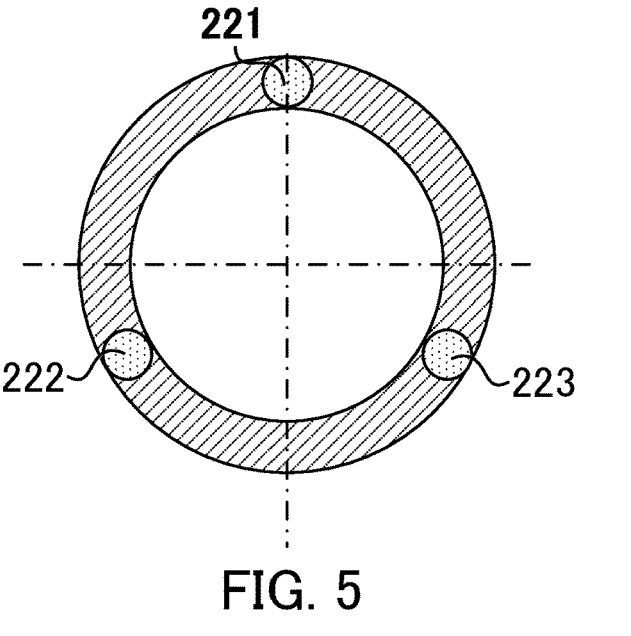
FIG. 5 is a diagram illustrating an example of a concave-convex pattern formed on an end surface of a lens frame included in the objective according to the second embodiment.
Figure 6:
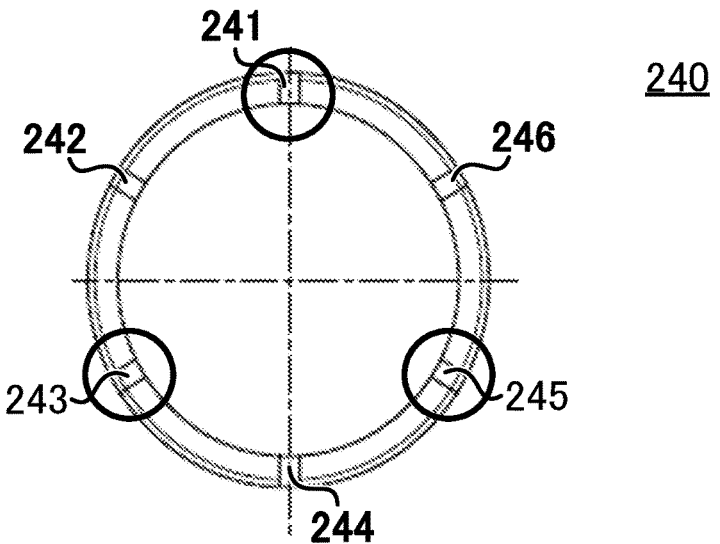
FIG. 6 is a diagram illustrating an example in which a concave portion of the presser ring illustrated in FIG. 4 is selected.

FIG. 4 is a front view of a presser ring 240 included in an objective according to the present embodiment. FIG. 5 is a diagram illustrating an example of a concave-convex pattern formed on an end surface of a lens frame 220 included in the objective according to the present embodiment. FIG. 6 is a diagram illustrating an example in which the concave portion of the presser ring 240 illustrated in FIG. 4 is selected. The objective according to the present embodiment will be described below with reference to FIGS. 4 to 6.

The objective according to the present embodiment is different from the objective 100 in that the presser ring 240 illustrated in FIG. 4 is provided instead of the presser ring 140 and the lens frame 220 illustrated in FIG. 5 is provided instead of the lens frame 121. Note that the configuration of the objective according to the present embodiment is the same as the configuration of the objective 100 except for the presser ring 240 and the lens frame 220. Therefore, components other than the presser ring 240 and the lens frame 220 included in the objective according to the present embodiment are referred to by the same reference numerals as those of the components of the objective 100 unless otherwise specified.

As illustrated in FIG. 4, the presser ring 240 is formed with six concave portions (a concave portion 241, a concave portion 242, a concave portion 243, a concave portion 244, a concave portion 245, and a concave portion 246) into which the jig 10 is selectively fitted when the presser ring is screwed into the objective barrel 110. More specifically, the presser ring 240 has an annular shape, and the six concave portions are provided at equal intervals in the circumferential direction of the presser ring 240 having an annular shape. In other words, the presser ring 240 is formed with six concave portions, the number of which is a multiple of three, in directions different from each other by 60 degrees. Note that the concave portion is a minus-shaped slit called a slot.

The lens frame 220 is, for example, a lens frame that is in direct contact with the presser ring 240. However, the lens frame 220 is not limited to a lens frame adjacent to the presser ring 240, and may be any lens frame included in the objective according to the present embodiment, or may be a lens frame to which a thin lens that is easily deformed is fixed.

Also in the objective according to the present embodiment configured as described above, the jig 10 illustrated in FIG. 3 is used when the presser ring 240 is screwed, as in the objective 100. However, since three protrusions are formed on the jig 10 at intervals of 120 degrees, in the assembly work, the operator selects one set including three concave portions disposed at intervals of 120 degrees from the six concave portions of the presser ring 240, and fits the protrusions of the jig 10 into the three concave portions of the selected set. This respect is a difference between the assembly process of the objective according to the present embodiment and the assembly process of the objective 100.

There is no difference between the assembly process of the objective according to the present embodiment and the assembly process of the objective 100 in that the presser ring 240 is then screwed into the objective barrel 110 by rotating the jig 10 to apply torque to the presser ring 240.

The objective according to the present embodiment is also the same as the objective 100 in that the torque is dispersed to three fulcrums when the presser ring 240 is screwed, and the pressure applied in the thrust direction is also dispersed to the three points simultaneously with the torque. Therefore, the objective according to the present embodiment can also suppress the deformation of the presser ring 240, as in the objective 100.

The end surface of each lens frame to which the pressure from the presser ring 240 is transmitted is formed to be substantially flat, but slight unevenness may exist due to manufacturing errors. Due to the unevenness, a slight gap may be generated in a specific orientation (phase) from the optical axis between the presser ring 240 and the lens frame and between the lens frames. If the orientation (phase) in which the slight gap is generated and the orientation (phase) of the region to which the pressure from the presser ring 240 is applied coincide with each other, the lens frame is likely to be deformed.

The objective according to the present embodiment can also cope with such a technical problem. Specifically, in the objective according to the present embodiment, since six concave portions are formed in the presser ring 240, it is possible to select, from two sets of the concave portions, three concave portions into which the protrusions of the jig 10 are fitted. Since the pressure from the presser ring 240 is mainly generated in the vicinity of the three concave portions into which the protrusions of the jig 10 are fitted, it is possible to further suppress the deformation of the lens frame by fitting the jig 10 by selecting the three concave portions while avoiding the orientation in which the above-described gap is generated. In other words, it is possible to suppress the deformation of the lens frame by determining the three concave portions into which the jig 10 is fitted in accordance with the orientation (phase) of the convex portion generated in the lens frame.

Therefore, in the present embodiment, the flatness of the end surface of the lens frame 220 included in the objective may be measured in advance before assembly of the objective, and the orientations (phases) of convex portions (a convex portion 221, a convex portion 222, and a convex portion 223) formed on the end surface may be specified as illustrated in FIG. 5. Then, according to the specified orientation (phase) of the convex portion of the lens frame 220, the concave portion (concave portion 241, concave portion 243, concave portion 245) may be selected from the presser ring 240 and determined as concave portions to be fitted with the protrusion of the jig 10, as illustrated in FIG. 6.

Although FIGS. 5 and 6 illustrate an example in which the concave portion of the presser ring 240 is selected in accordance with the orientation of the convex portion of the lens frame 220, the selection criterion of the concave portion of the presser ring 240 is not limited to this example. The pressure from the presser ring 240 to the lens frame may be transmitted while avoiding the gap between the presser ring 240 and the lens frame and the gap between the lens frames. Therefore, in the case where, at the time of screwing, due to a slight deformation of the presser ring 240 caused by the resultant force of the force applied to the concave portion of the presser ring 240 in the thrust direction and the torque, a portion different from the concave portion to which the force of the presser ring 240 is applied protrudes, the concave portion of the presser ring 240 may be selected such that the protruding portion overlaps the convex portion of the lens frame 220, and may be fitted to the protrusion of the jig 10.

For example, in the case where the protrusions of the jig 10 are fitted into the concave portion 242, the concave portion 244, and the concave portion 246 illustrated in FIG. 6, and the presser ring 240 is deformed by the resultant force of the force applied in the thrust direction and the torque such that the vicinities of the back sides of the concave portion 241, the concave portion 243, and the concave portion 245 protrude, the concave portion 242, the concave portion 244, and the concave portion 246 may be selected and the protrusions of the jig 10 may be fitted into these concave portions. Thus, while the deformation of the presser ring 240 is suppressed by the forces dispersed to the three points, the pressure can be transmitted to the lens frame 220 via the convex portion 221, the convex portion 222, and the convex portion 223 of the lens frame 220 by using the protruding portion formed on the presser ring which is slightly deformed by the dispersed forces. Therefore, it is possible to prevent a large force from being applied to the gap formed between the lens frame 220 and the presser ring 240, and thus it is possible to further suppress the deformation of the lens frame 220.

Note that, although the present embodiment has illustrated an example in which the presser ring 240 has six concave portions, the number of concave portions may be a multiple of three, and more preferably a multiple of three which is six or more. Further, it is desirable that the concave portions are provided at equal intervals in the circumferential direction. Thus, the three concave portions into which the jig 10 is fitted can be selected from a plurality of sets, and thus the same effect as that of the objective according to the present embodiment can be obtained.

Third Embodiment

Figure 7:
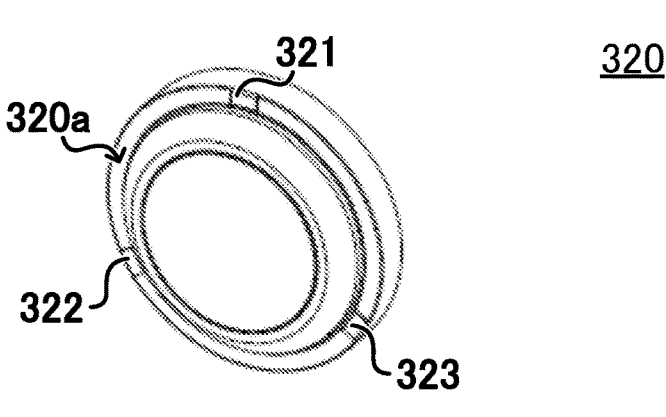
FIG. 7 is a perspective view of a lens frame included in an objective according to a third embodiment.

FIG. 7 is a perspective view of a lens frame included in an objective according to the present embodiment. The objective according to the present embodiment will be described below with reference to FIG. 7.

The objective according to the present embodiment is different from the objective according to the second embodiment in that a lens frame 320 illustrated in FIG. 7 is provided instead of the lens frame 220. Note that the configuration of the objective according to the present embodiment is the same as the configuration of the objective according to the second embodiment except for the lens frame 320. Therefore, components other than the lens frame 320 included in the objective according to the present embodiment are referred to by the same reference numerals as those of the components of the objective according to the second embodiment unless otherwise specified.

The second embodiment has illustrated an example in which, in order to transmit the pressure to the lens frame 220 from the position contacted without a gap, the presser ring 240 is provided with six concave portions, the number of which is a multiple of three, and three concave portions to be fitted with the jig 10 are selected from the six concave portions according to the position of the convex portion which is unintentionally generated on the lens frame 220 due to the manufacturing error or the like. However, the configuration in which the pressure is transmitted to the lens frame from the contact position without a gap is not limited to this example. As illustrated in FIG. 7, three concave portions to be fitted with the jig 10 may be selected from the six concave portions according to the positions of protrusions (a protrusion 321, a protrusion 322, and a protrusion 323) intentionally formed on an end surface 320a of the lens frame 320.

More specifically, the lens frame 320 has an annular shape, and has three protrusions provided on the end surface 320a at equal intervals in the circumferential direction of the lens frame 320. The end surface 320a may be an end surface that is in contact with a lens frame, which is different from the lens frame 320, or the presser ring 240, and may be an end surface on the object side or an end surface on the image side. Note that the lens frame 320 is, for example, a lens frame that is in direct contact with the presser ring 240, but may be a lens frame disposed at another position. The objective according to the present embodiment may include at least one lens frame 320, and two or more lens frames 320 may be included in the objective according to the present embodiment.

The objective according to the present embodiment can also obtain the same effect as the objective according to the second embodiment. In the objective according to this embodiment, since the protrusion provided on the lens frame 320 is formed as a step on the end surface 320a, the position of the protrusion can be visually confirmed. Since three concave portions may be selected according to the position of the protrusion, the three concave portions to be fitted with the jig 10 can be determined without measuring the flatness of the end surface of the lens frame.

Fourth Embodiment

Figure 8:
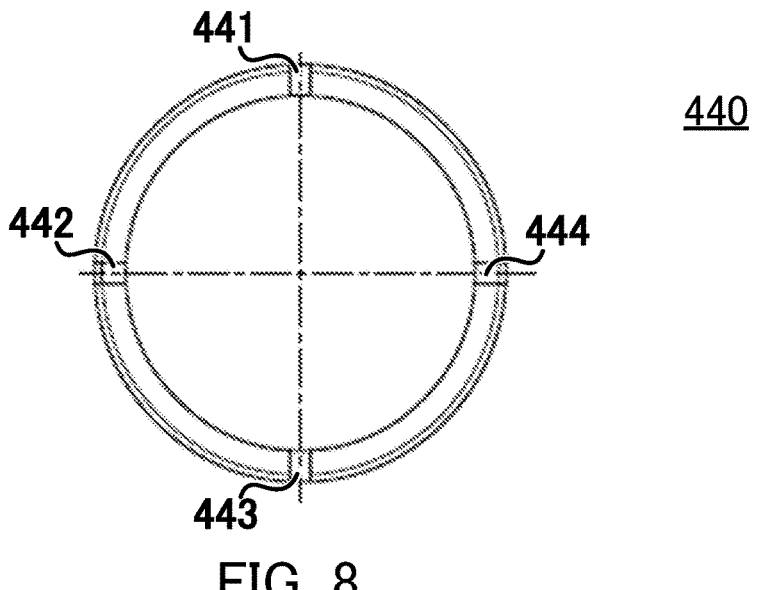
FIG. 8 is a front view of a presser ring included in an objective according to a fourth embodiment.

FIG. 8 is a front view of a presser ring included in an objective according to the present embodiment. The objective according to the present embodiment will be described below with reference to FIG. 8.

The objective according to the present embodiment is different from the objective according to the second embodiment in that a presser ring 440 illustrated in FIG. 8 is provided instead of the presser ring 240. Note that the configuration of the objective according to the present embodiment is the same as the configuration of the objective according to the second embodiment except for the presser ring 440. Therefore, components other than the presser ring 440 included in the objective according to the present embodiment are referred to by the same reference numerals as those of the components of the objective according to the second embodiment unless otherwise specified.

The second embodiment has illustrated an example in which, in order to transmit the pressure to the lens frame 220 from the position contacted without a gap, the presser ring 240 is provided with six concave portions, the number of which is a multiple of three, and three concave portions to be fitted with the jig 10 are selected from the six concave portions according to the position of the convex portion which is generated on the lens frame 220 due to the manufacturing error or the like. However, the configuration in which the pressure is transmitted to the lens frame from the contact position without a gap is not limited to this example. As illustrated in FIG. 8, the presser ring 440 may be formed with four concave portions (a concave portion 441, a concave portion 442, a concave portion 443, and a concave portion 444) into which a jig is fitted when the presser ring is screwed into the objective barrel 110. This configuration allows the presser ring 440 to be screwed by using a two-point support jig conventionally used in an objective assembly process.

More specifically, the presser ring 440 has an annular shape, and the four concave portions are provided at equal intervals in the circumferential direction of the presser ring 440 having an annular shape. In other words, the presser ring 440 is formed with the four concave portions in directions different from each other by 90 degrees. Note that the concave portion is a minus-shaped slit called a slot.

Also in the objective according to the present embodiment configured as described above, the flatness of the end surface of the lens frame included in the objective may be measured in advance before assembly of the objective, and the orientation (phase) of the convex portion formed on the end surface may be specified. Then, according to the specified orientation (phase) of the convex portion of the lens frame, two concave portions may be selected from the four concave portions of the presser ring 440 illustrated in FIG. 8, and the protrusions of the two-point support jig may be fitted into the selected concave portions.

According to the objective of the present embodiment, a conventionally used two-point support jig can be used. By appropriately selecting one set from a plurality of sets of concave portions each including two concave portions, the force can be transmitted by positively utilizing the deformation of the presser ring 440 caused by the use of the two-point support jig, and thus the presser ring 440 can be screwed into the objective barrel 110 while suppressing the deformation of the lens frame, as in the objective according to the second embodiment.

Note that the present embodiment has illustrated an example in which the presser ring 440 has four concave portions, but the number of concave portions may be an even number of four or more, and it is desirable that the concave portions are provided at equal intervals in the circumferential direction. Thus, two concave portions into which the jig is fitted can be selected from a plurality of sets, and thus the same effect as that of the objective according to the present embodiment can be obtained.

Fifth Embodiment

Figure 9:
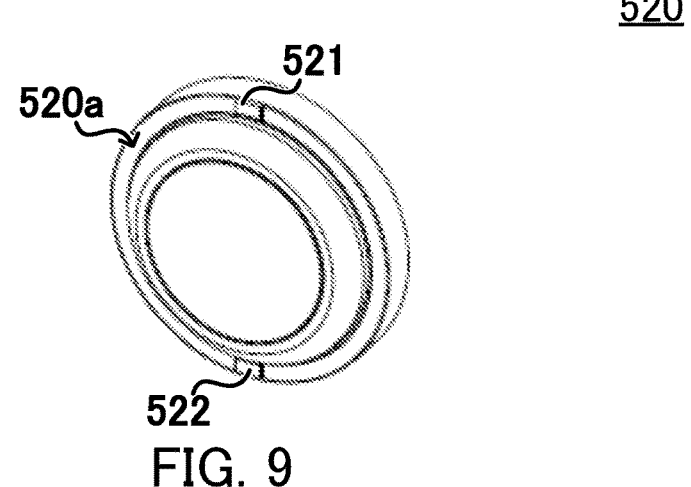
FIG. 9 is a perspective view of a lens frame included in an objective according to a fifth embodiment.

FIG. 9 is a perspective view of a lens frame included in an objective according to the present embodiment. The objective according to the present embodiment will be described below with reference to FIG. 9.

The objective according to the present embodiment is different from the objective according to the fourth embodiment in that a lens frame 520 is provided. Note that the configuration of the objective according to the present embodiment is the same as the configuration of the objective according to the fourth embodiment except for the lens frame 520. Therefore, components other than the lens frame 520 included in the objective according to the present embodiment are referred to by the same reference numerals as those of the components of the objective according to the fourth embodiment unless otherwise specified.

The fourth embodiment has illustrated an example in which, in order to transmit the pressure to the lens frame from the position contacted without a gap, the presser ring 440 is provided with four concave portions, and two concave portions are selected from the four concave portions according to the position of the convex portion generated on the lens frame due to the manufacturing error or the like to be fitted with the jig. However, the configuration in which the pressure is transmitted to the lens frame from the contact position without a gap is not limited to this example. As illustrated in FIG. 9, two concave portions may be selected from the four concave portions according to the positions of the protrusions (a protrusion 521 and a protrusion 522) intentionally formed on an end surface 520_a_ of the lens frame 520, and the selected two concave portions may be determined as concave portions to be fitted with the jigs.

More specifically, the lens frame 520 has an annular shape, and has two protrusions provided on the end surface 520_a_ at equal intervals in the circumferential direction of the lens frame 520. The end surface 520_a_ may be an end surface that is in contact with a lens frame, which is different from the lens frame 520, or the presser ring 440, and may be an end surface on the object side or an end surface on the image side. Note that the lens frame 520 is, for example, a lens frame that is in direct contact with the presser ring 440, but may be a lens frame disposed at another position. The objective according to the present embodiment may include at least one lens frame 520, and two or more lens frames 520 may be included in the objective according to the present embodiment.

The objective according to the present embodiment can also obtain the same effect as the objective according to the fourth embodiment. In the objective according to the present embodiment, since two concave portions may be selected according to the positions of the protrusions provided on the lens frame 520, the two concave portions to be fitted with the jig can be determined without measuring the flatness of the end surface of the lens frame.

Sixth Embodiment

Figure 10:
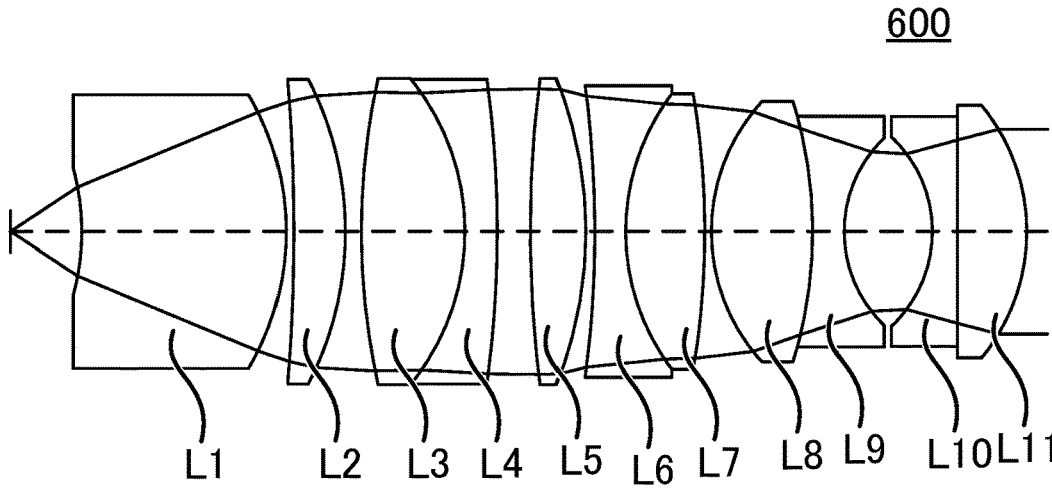
FIG. 10 is a cross-sectional view of a lens group included in an objective according to a sixth embodiment.

FIG. 10 is a cross-sectional view of a lens group included in an objective according to the present embodiment. The objective according to the present embodiment will be described below with reference to FIG. 10.

The objective according to the present embodiment is different from the objective 100 in that a lens group 600 including a plurality of lenses (lenses L1 to L11) illustrated in FIG. 10 is housed in the objective barrel 110. The objective according to the present embodiment is the same as the objective 100 in other respects. Note that the lens group 600 illustrated in FIG. 10 is fixed to a lens frame not illustrated.

As described above, a thin lens is beneficial in achieving high optical performance. In particular, a lens having a small thickness with respect to the outer diameter of the lens is easily deformed due to the small rigidity of the lens, and is particularly likely to cause an error in astigmatism, but such a lens is beneficial in achieving an objective having a predetermined size and high optical properties. Therefore, it is desirable that the objective is configured to include such a lens.

Specifically, in order for the objective to achieve high optical performance for the size of the objective, it is desirable that the objective includes at least one single lens that satisfies the following conditional expression (1):

$$0 < t_{min} / \varphi < 0.12 \qquad (1)$$

where $t_{min}$ is the thickness in the optical axis direction of the thinnest portion of the at least one single lens. If the single lens is a positive lens, $t_{min}$ is the thickness of the edge of the positive lens, and if the single lens is a negative lens, $t_{min}$ is the thickness on the optical axis of the negative lens. $\varphi$ is the outer diameter of the at least one single lens.

For the same reason, it is more desirable to include one single lens that satisfies the following conditional expression (2) or (3):

$$0 < t_{min} / \varphi < 0.08 \qquad (2)$$

$$0 < t_{min} / \varphi < 0.06 \qquad (3)$$

The lens group 600 of the objective according to the present embodiment includes a lens that at least satisfies the conditional expression (1). Specifically, the lenses that at least satisfy the conditional expression (1) are the lens L2 and the lens L5, and details of the shapes of the lenses are as follows. The lens L2 and the lens L5 satisfy the conditional expressions (1) and (2).

(Lens L2)

Thickness on optical axis: 2.49 mm, thickness of edge: 0.86 mm, and outer diameter: 15 mm $$t_{min} / \varphi = 0.86 \ mm / 15 \ mm = 0.06$$

(Lens L5)

Thickness on optical axis: 3.12 mm, thickness of edge: 0.92 mm, and outer diameter: 16.5 mm $$t_{min} / \varphi = 0.92 \ mm / 16.5 \ mm = 0.06$$

In the objective according to the present embodiment, dispersing the torque to the three concave portions of the presser ring 140 allows to suppress the deformation of the presser ring 140, and thus to suppress the deformation of the lens (particularly, the lens L2 and the lens L5), as in the objective 100. Therefore, according to the objective of the present embodiment, it is possible to achieve compactness and high optical performance without deteriorating the performance using a lens that is easily deformed.

Seventh Embodiment

Figure 11:
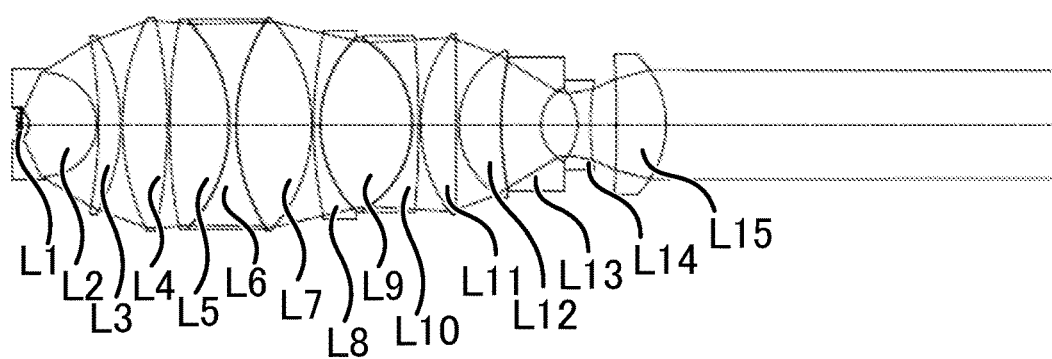
FIG. 11 is a cross-sectional view of a lens group included in an objective according to a seventh embodiment.

FIG. 11 is a cross-sectional view of a lens group included in an objective according to the present embodiment. The objective according to the present embodiment will be described below with reference to FIG. 11.

The objective according to the present embodiment is different from the objective 100 in that a lens group 700 including a plurality of lenses (lenses L1 to L15) illustrated in FIG. 11 is housed in the objective barrel 110. The objective according to the present embodiment is the same as the objective 100 in other respects. Note that the lens group 700 illustrated in FIG. 11 is fixed to a lens frame not illustrated.

The lens group 700 of the objective according to the present embodiment includes a lens that at least satisfies the conditional expression (1). Specifically, the lenses that at least satisfy the conditional expression (1) are the lens L3, the lens L4, the lens L11 and the lens L14, and details of the shapes of the lenses are as follows. The lens L3, the lens L4, and the lens L11 satisfy all of the conditional expressions (1) to (3). The lens L14 satisfies the conditional expression (1).

(Lens L3)

Thickness on optical axis: 1.7 mm, thickness of edge: 0.48 mm, and outer diameter: 13.9 mm $$t_{min} / \varphi = 0.48 \ mm / 13.9 \ mm = 0.03$$

(Lens L4)

Thickness on optical axis: 3.43 mm, thickness of edge: 0.43 mm, and outer diameter: 16.9 mm $$t_{min} / \varphi = 0.43 \ mm / 16.9 \ mm = 0.03$$

(Lens L11)

Thickness on optical axis: 2.77 mm, thickness of edge: 0.35 mm, and outer diameter: 14 mm $$t_{min} / \varphi = 0.35 \ mm / 14 \ mm = 0.03$$

(Lens L14)

Thickness on optical axis: 0.98 mm, thickness of edge: 2.51 mm, and outer diameter: 9 mm $$t_{min} / \varphi = 0.98 \ mm / 9 \ mm = 0.11$$

In the objective according to the present embodiment, dispersing the torque to the three concave portions of the presser ring 140 allows to suppress the deformation of the presser ring 140, and thus to suppress the deformation of the lens (particularly, the lens L3, the lens L4, the lens L11, and the lens L14), as in the objective 100. Therefore, according to the objective of the present embodiment, it is possible to achieve compactness and high optical performance without deteriorating the performance using a lens that is easily deformed.

Eighth Embodiment

FIG. 12 is a front view of a presser ring 840 included in an objective according to the present embodiment. The objective according to the present embodiment will be described below with reference to FIG. 12.

The objective according to the present embodiment is different from the objective according to the second embodiment in that a presser ring 840 illustrated in FIG. 12 is provided instead of the presser ring 240. Note that the configuration of the objective according to the present embodiment is the same as the configuration of the objective according to the second embodiment except for the presser ring 840.

As illustrated in FIG. 12, the presser ring 840 has an annular shape, and six concave portions (a concave portion 841, a concave portion 842, a concave portion 843, a concave portion 844, a concave portion 845, and a concave portion 846) into which a jig is selectively fitted when the presser ring is screwed into the objective barrel 110 are provided at equal intervals in the circumferential direction of the presser ring 840. Note that the presser ring 840 is different from the presser ring 240 in that the concave portion is not composed of a slit, which is called a slot, but a circular hole. Note that the shape of the hole, which is a concave portion of the presser ring 840, is not limited to a circular shape, and may be a rectangular shape or another polygonal shape such as a hexagonal shape, for example.

The objective according to the present embodiment can also obtain the same effect as the objective according to the second embodiment. Note that, in the present embodiment, a jig (in this example, a jig having a columnar tip portion) having a tip portion with a shape in accordance with the concave portion of the presser ring 840 is used.

Ninth Embodiment

FIG. 13 is a front view of a presser ring 940 included in an objective according to the present embodiment. The objective according to the present embodiment will be described below with reference to FIG. 13.

The objective according to the present embodiment is different from the objective according to the fourth embodiment in that the presser ring 940 illustrated in FIG. 13 is provided instead of the presser ring 440. Note that the configuration of the objective according to the present embodiment is the same as the configuration of the objective according to the fourth embodiment except for the presser ring 940.

As illustrated in FIG. 13, the presser ring 940 has an annular shape, and four or more even-numbered, specifically, eight concave portions (a concave portion 941, a concave portion 942, a concave portion 943, a concave portion 944, a concave portion 945, a concave portion 946, a concave portion 947, and a concave portion 948) into which a jig is selectively fitted when the presser ring is screwed into the objective barrel 110 are provided at equal intervals in the circumferential direction of the presser ring 940. Note that the presser ring 940 is different from the presser ring 440 in that the concave portion is not composed of a slit, which is called a slot, but a circular hole and that the number of concave portions is different. Note that the shape of the hole, which is a concave portion of the presser ring 940, is not limited to a circular shape, and may be a rectangular shape or another polygonal shape such as a hexagonal shape.

The objective according to the present embodiment can also obtain the same effect as the objective according to the fourth embodiment. Note that, also in the present embodiment, a jig (in this example, a jig having a columnar tip portion) having a tip portion with a shape in accordance with the concave portion of the presser ring 940 is used.

Tenth Embodiment

Figure 14:
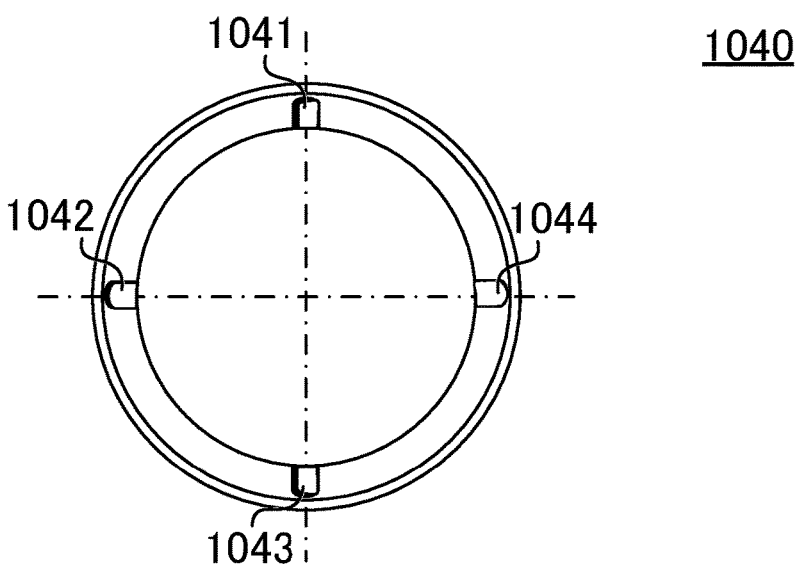
FIG. 14 is a front view of a presser ring included in an objective according to a tenth embodiment.

FIG. 14 is a front view of a presser ring 1040 included in an objective according to the present embodiment. The objective according to the present embodiment will be described below with reference to FIG. 14.

The objective according to the present embodiment is different from the objective according to the fourth embodiment in that a presser ring 1040 illustrated in FIG. 14 is provided instead of the presser ring 440. Note that the configuration of the objective according to the present embodiment is the same as the configuration of the objective according to the fourth embodiment except for the presser ring 1040.

As illustrated in FIG. 14, the presser ring 1040 has an annular shape, and four concave portions (a concave portion 1041, a concave portion 1042, a concave portion 1043, and a concave portion 1044) into which a jig is selectively fitted when the presser ring is screwed into the objective barrel 110 are provided at equal intervals in the circumferential direction of the presser ring 1040. Note that the presser ring 1040 is the same as the presser ring 440 in that the concave portion is a minus-shaped slit called a slot. However, the presser ring 1040 is different from the presser ring 440 in that the slit of the presser ring 440 traverses from the inner side surface to the outer side surface of the presser ring 440, whereas the slit of the presser ring 1040 is formed only halfway from the inner side surface of the presser ring 1040.

The objective according to the present embodiment can also obtain the same effect as the objective according to the fourth embodiment.

Eleventh Embodiment

Figure 15:
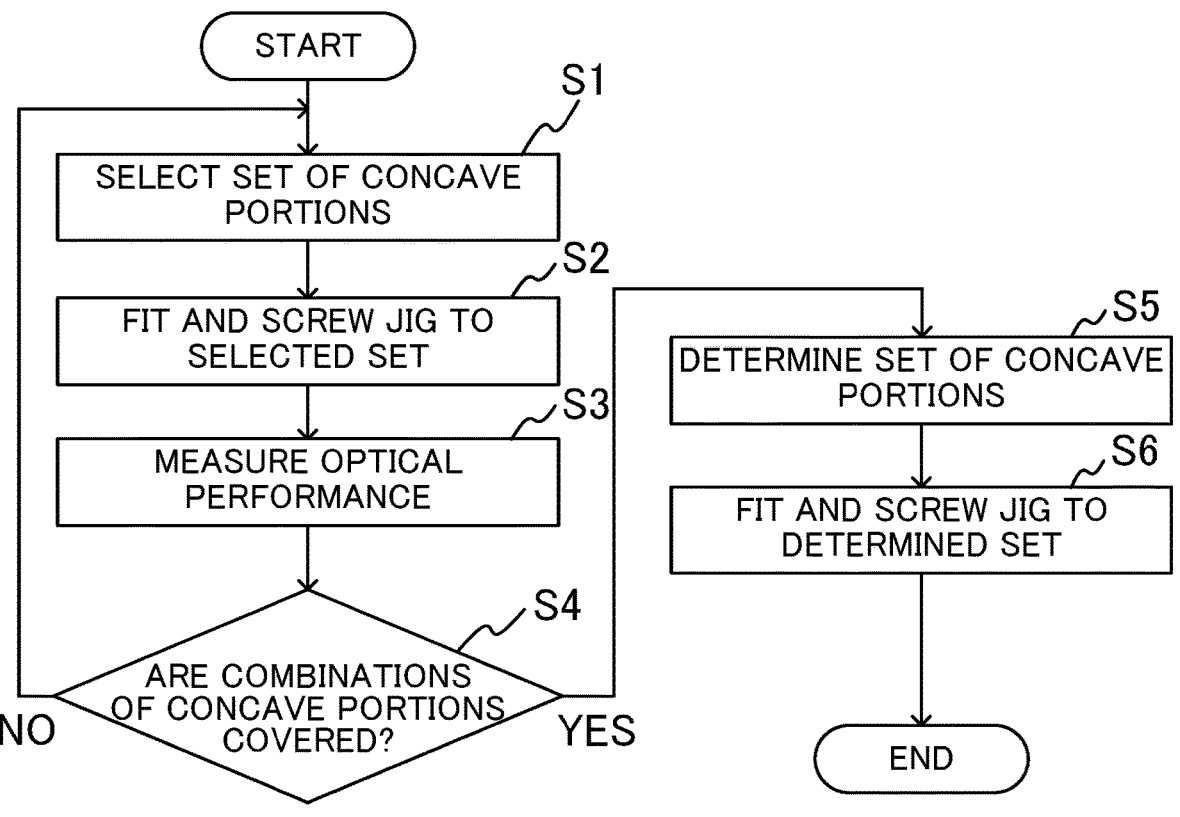
FIG. 15 is a flowchart illustrating a procedure for assembling an objective according to an eleventh embodiment.

FIG. 15 is a flowchart illustrating a procedure for assembling an objective according to the present embodiment. The objective according to the present embodiment will be described below with reference to FIG. 15.

The objective according to the present embodiment is the same as the objective according to the second embodiment except that the assembly method is different. Specifically, in the objective according to the second embodiment, the flatness of the end surface of the lens frame 220 is measured, and the three concave portions to be fitted into the protrusions of the jig 10 are determined based on the measurement result, but in the objective according to the present embodiment, the three concave portions to be fitted into the protrusions of the jig 10 are determined by the procedure illustrated in FIG. 15, and the jig is fitted into the determined concave portions to screw the presser ring 240 into the objective barrel 110. Note that the procedure illustrated in FIG. 15 can be manually performed by an operator, but a case where the procedure is automated by a dedicated device will be described below as an example.

The device first selects one set including three concave portions from six (an example of a multiple of three which is six or more) concave portions provided in the presser ring 240 included in the objective (Step S1). The device then screws the presser ring 240 into the objective barrel 110 by the jig 10 in which the three protrusions are fitted into the one set including the three concave portions selected in Step S1 (Step S2). The device then measures the optical performance of the objective (Step S3). The optical performance of the objective to be measured in Step S3 is not particularly limited, but may be evaluated by, for example, measurement of astigmatism of axial light and extinction ratio, which is also performed in a conventional process of assembling an objective. Note that, after measuring the optical performance, the device loosens the presser ring 240 by using the jig 10.

Once the optical performance is measured, the device determines whether all of the plurality of sets each including three concave portions included in the presser ring 240 have been covered, that is, whether the optical performance of the objective has been measured for all of the sets including three concave portions (Step S4). If there is a set that has not been used for the measurement of the optical performance (NO in Step S4), the device repeats the processes from Step S1 to Step S3 to measure the optical performance of the objective for the set that has not been measured. Specifically, in the present embodiment in which there are six concave portions, Step S1 to Step S3 are repeated once, whereby the optical performance of the objective is measured for a total of two sets. Note that, if the number of concave portions is six or more and is a multiple of three, Step S1 through Step S3 are repeated at least once.

Once the optical performance of the objective has been measured for all the sets (YES in Step S4), the device determines, based on the optical performance measured in Steps S3 performed at least twice, one set from a plurality of sets each set including the three concave portions selected in Step S1 (Step S5). In Step S5, the device may select the set used for the assembly of the objective when the highest optical performance has been measured. The device then fits the three protrusions of the jig 10 into the three concave portions included in the one set determined in Step S5, screws the presser ring 240 into the objective barrel 110 by the jig 10 (Step S6), and ends the assembly work of the objective.

The objective according to the present embodiment can also obtain the same effect as that of the second embodiment. In the present embodiment, since the set of concave portions most suitable for assembly in terms of optical performance is determined by measuring the optical performance of the objective actually assembled, it is possible to ensure the optical performance with higher accuracy. The measurement of optical performance is one of the conventional steps in the assembly work of the objective. Therefore, since it is possible to determine the optimum concave portion without adding a new process which is not included in the assembly of the objective in the related art, it is possible to minimize an increase in cost due to the search work performed for determining the optimum concave portion set.

Note that, although the present embodiment has described an example in which the objective provided with the presser ring having six or more concave portions, the number of which is a multiple of three, the above-described assembly method may be applied to, for example, an objective in which the presser ring has four or more even-numbered concave portions, such as the objective according to the second embodiment, the objective according to the ninth embodiment, and the objective according to the tenth embodiment. In this case, instead of the jig 10 having three protrusions, a jig having two protrusions may be used to screw the presser ring. In Step S1, the device may select a set of two concave portions from four or more even-numbered concave portions provided in the presser ring. In Step S2, the device may screw the presser ring into the objective barrel 110 by a jig in which the two protrusions are fitted into the set including two concave portions selected in Step S1. Further, in Step S6, the device may fit the two protrusions of the jig into the two concave portions included in the one set determined in Step S5, and screw the presser ring into the objective barrel 110 by the jig. Also in this case, the same effect as that of the assembly of the objective according to the present embodiment can be obtained.

Twelfth Embodiment

Figure 16:
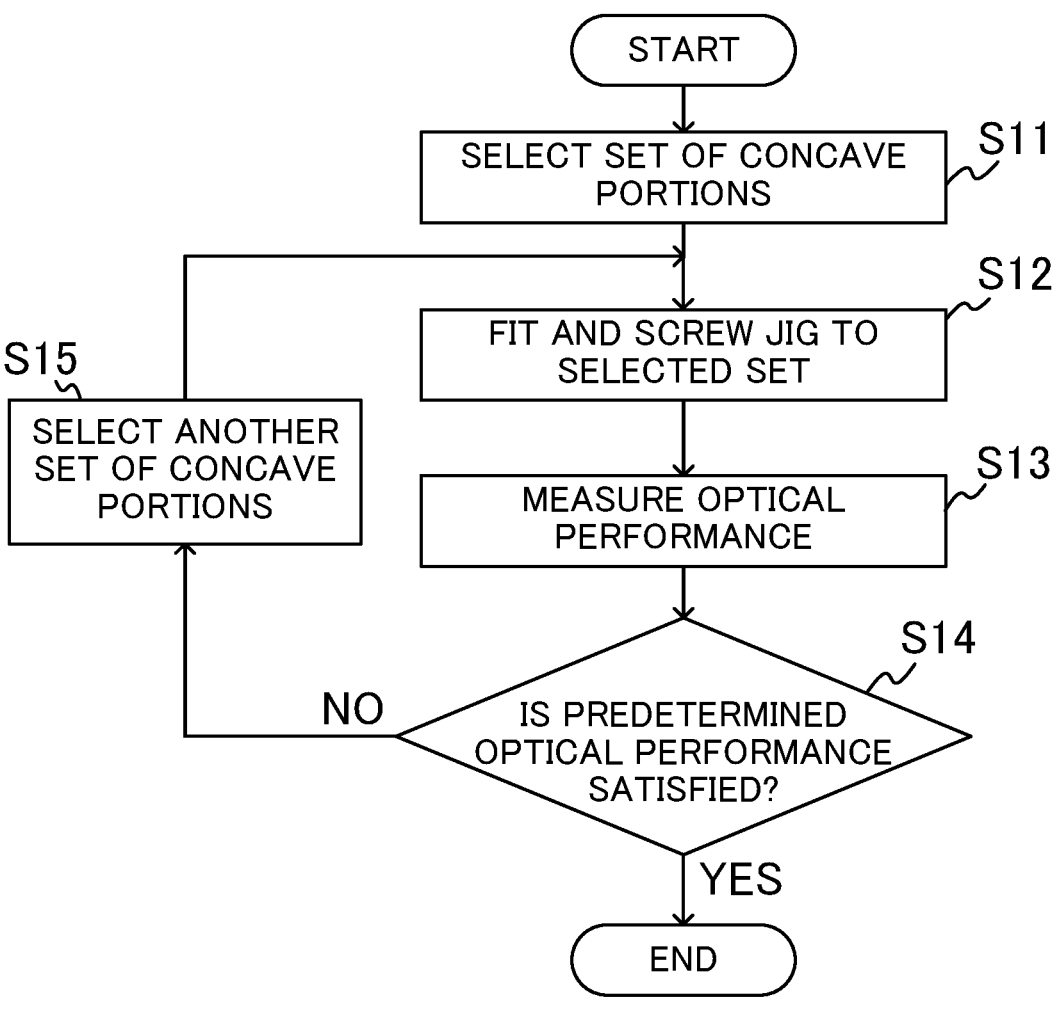
FIG. 16 is a flowchart illustrating a procedure for assembling an objective according to a twelfth embodiment.

FIG. 16 is a flowchart illustrating a procedure for assembling an objective according to the present embodiment. The objective according to the present embodiment will be described below with reference to FIG. 16.

The objective according to the present embodiment is the same as the objective according to the eleventh embodiment except that the assembly method is different. Specifically, the eleventh embodiment has illustrated an example in which the optical performance of the objective is measured for all the sets each including three concave portions, a set that can be assembled with the best optical performance is determined, and the objective is reassembled. On the other hand, the present embodiment is different from the eleventh embodiment in that, as illustrated in FIG. 16, the optical performance is measured while sequentially changing the set of concave portions to be fitted to the jig 10 (Steps S11 to S15), and the work is ended at the time when a predetermined optical performance is satisfied (YES in Step S14).

The objective according to the present embodiment can also obtain the same effect as that of the objective according to the eleventh embodiment. In the present embodiment, since the work is ended when the predetermined optical performance is satisfied, the assembly work can be ended in a shorter time than in the eleventh embodiment, and the work of reassembling after the optical measurement can also be omitted.

Thirteenth Embodiment

Figure 17:
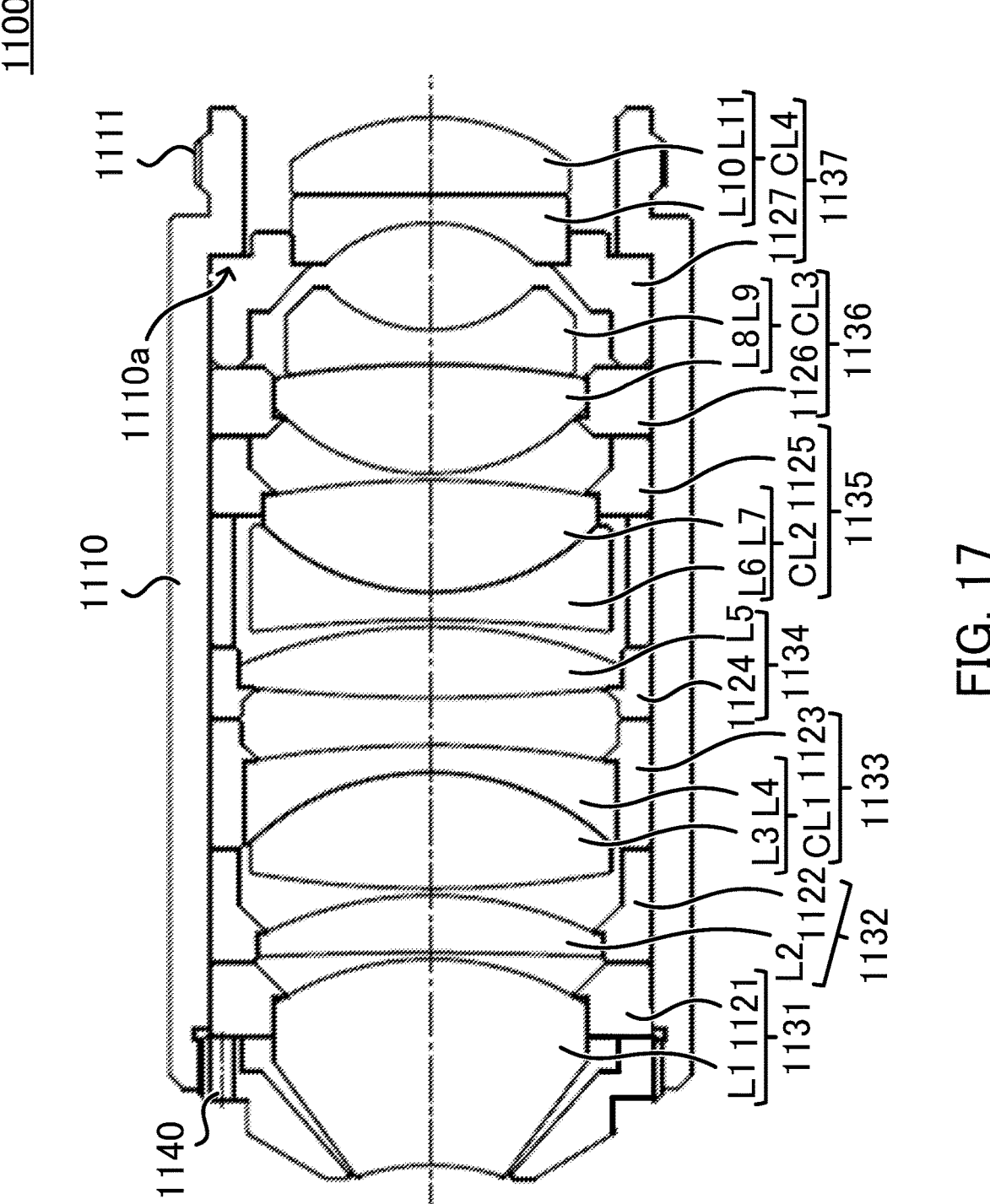
FIG. 17 is a cross-sectional view of an objective according to a thirteenth embodiment.

FIG. 17 is a cross-sectional view of an objective according to the present embodiment. The objective according to the present embodiment will be described below with reference to FIG. 17.

As illustrated in FIG. 17, an objective 1100 includes an objective barrel 1110, a plurality of lens sub-assemblies (a lens sub-assembly 1131, a lens sub-assembly 1132, a lens sub-assembly 1133, a lens sub-assembly 1134, a lens sub-assembly 1135, a lens sub-assembly 1136, and a lens sub-assembly 1137), and a presser ring 1140.

Each lens sub-assembly includes lenses (a lens L1, a lens L2, a cemented lens CL1 including a lens L3 and a lens L4, a lens L5, a cemented lens CL2 including a lens L6 and a lens L7, a cemented lens CL3 including a lens L8 and a lens L9, and a cemented lens CL4 including a lens L10 and a lens L11), and lens frames (a lens frame 1121, a lens frame 1122, a lens frame 1123, a lens frame 1124, a lens frame 1125, a lens frame 1126, and a lens frame 1127) that hold the lenses.

The objective 1100 is different from the objective 100 in that an abutment surface 1110a facing the object side is provided in the vicinity of the end portion of the objective barrel 1110 on the image side, and the presser ring 1140 is screwed into a screw thread formed on the end portion of the objective barrel 1110 on the object side. Note that the presser ring 1140 is the same as the presser ring 140 in that the presser ring 1140 is formed with three concave portions. As in the objective 1100, the presser ring 1140 may be screwed into the objective barrel 1110 so as to press the plurality of lens sub-assemblies from the object side to the image side.

The objective 1100 according to the present embodiment can also obtain the same effect as the objective 100.

Fourteenth Embodiment

Figure 18:
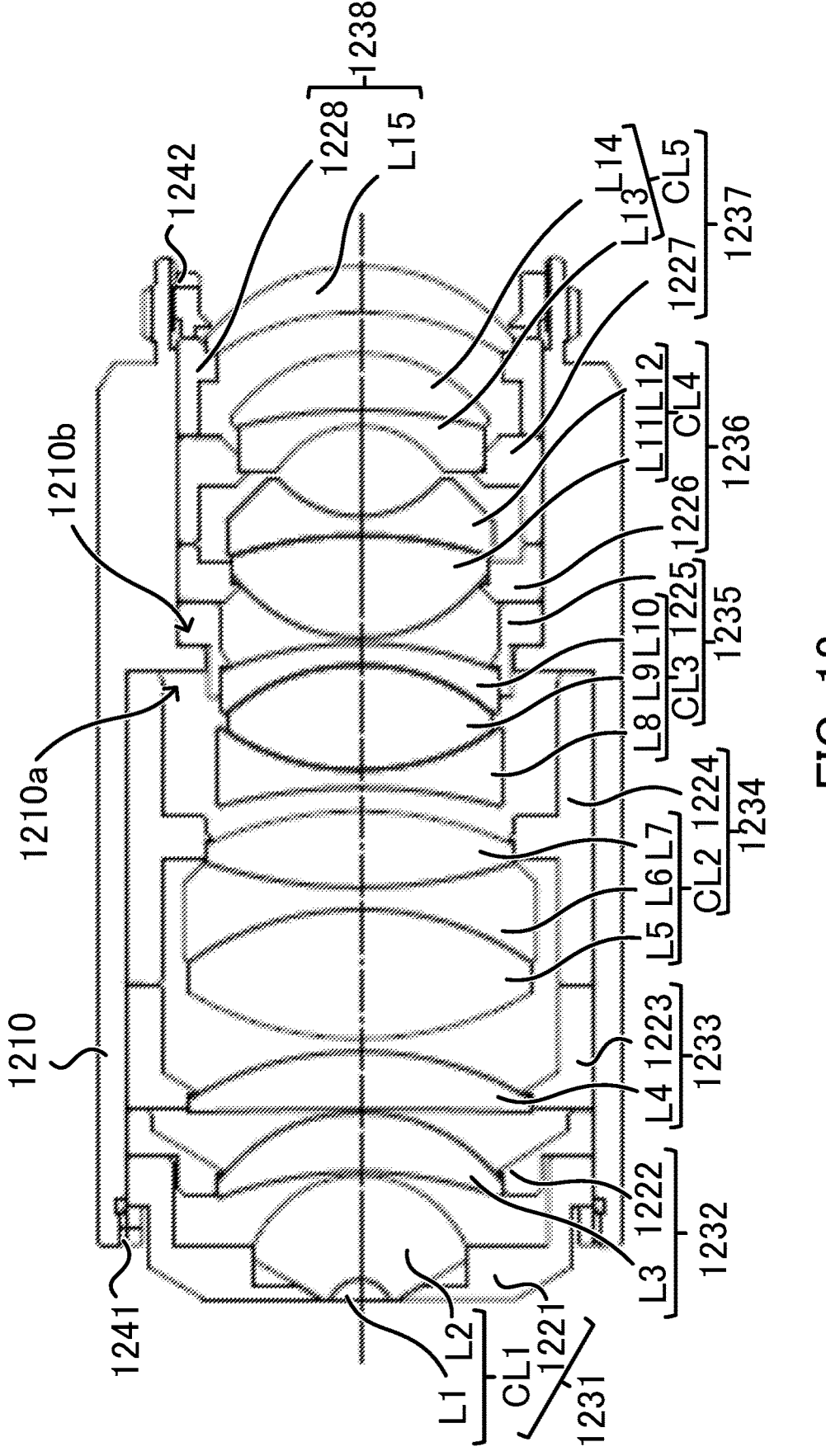
FIG. 18 is a cross-sectional view of an objective according to a fourteenth embodiment.

FIG. 18 is a cross-sectional view of an objective according to the present embodiment. The objective according to the present embodiment will be described below with reference to FIG. 18.

As illustrated in FIG. 18, an objective 1200 includes an objective barrel 1210, a plurality of lens sub-assemblies (a lens sub-assembly 1231, a lens sub-assembly 1232, a lens sub-assembly 1233, a lens sub-assembly 1234, a lens sub-assembly 1235, a lens sub-assembly 1236, a lens sub-assembly 1237, and a lens sub-assembly 1238), and a presser ring 1241 and a presser ring 1242.

Each lens sub-assembly includes lenses (a cemented lens CL1 including a lens L1 and a lens L2, a lens L3, a lens L4, a cemented lens CL2 including a lens L5, a lens L6 and a lens L7, a cemented lens CL3 including a lens L8, a lens L9 and a lens L10, and a cemented lens CL4 including a lens L11 and a lens L12, a cemented lens CL5 including a lens L13 and a lens L14, and a lens L15), and lens frames (a lens frame 1221, a lens frame 1222, a lens frame 1223, a lens frame 1224, a lens frame 1225, a lens frame 1226, a lens frame 1227, and a lens frame 1228) that hold the lenses.

The objective 1200 is different from the objective 100 in that the objective barrel 1210 has an abutment surface 1210$a$ facing the object side and an abutment surface 1210$b$ facing the image side, the presser ring 1241 is screwed into a screw thread formed on the end portion of the objective barrel 1210 on the object side, and the presser ring 1242 is screwed into a screw thread formed on the end portion of the objective barrel 1210 on the image side. Note that the presser ring 1241 and the presser ring 1242 are the same as the presser ring 140 in that three concave portions are formed in each of the presser ring 1241 and the presser ring 1242. As in the objective 1200, the presser ring 1241 and the presser ring 1242 may be screwed into the objective barrel 1210 so as to press a plurality of different lens sub-assemblies from both the image side and the object side.

The objective 1200 according to the present embodiment can also obtain the same effect as the objective 100. As described in the first embodiment, the thirteenth embodiment, and the present embodiment, the presser ring may be provided on at least one of the object-side end portion and the image-side end portion of the objective barrel. As in the first embodiment and the thirteenth embodiment, in the case where the outer diameters of the plurality of lens frames included in the objective are all equal and the inner diameter of the objective barrel is constant, all the lens sub-assemblies may be held in the objective barrel by using one presser ring. On the other hand, as in the present embodiment, in the case where the inner diameter of the objective barrel is different between the object side and the image side, the lens sub-assembly may be held in the objective barrel by using two presser rings screwed into both the object side and the image side of the objective barrel.

The above-described embodiments are specific examples to facilitate an understanding of the invention, and hence the present invention is not limited to such embodiments. Modifications obtained by modifying the above-described embodiments and alternatives to the above-described embodiments may also be included. In other words, the constituent elements of each embodiment can be modified without departing from the spirit and scope of the embodiment. Moreover, new embodiments can be implemented by appropriately combining a plurality of constituent elements disclosed in one or more of the embodiments. Furthermore, some constituent elements may be omitted from the constituent elements in each embodiment, or some constituent elements may be added to the constituent elements in each embodiment. Further, the order of the processing procedure disclosed in each embodiment may be changed as long as no contradiction results. In other words, the objective and the method of assembling the objective of the present invention can be variously modified and changed without departing from the scope of the claims.

Note that, in the above-described embodiment, the presser ring having three or more concave portions has been described. The rotation angle of the screw at the stage of fastening the presser ring is unknown. Also in this respect, it is desirable that there are three or more concave portions into which the jig is fitted.

What is claimed is:

1. A method of assembling an objective, the objective comprising: an objective barrel; a plurality of lens sub-assemblies stacked in an optical axis direction of the objective in the objective barrel, each of the plurality of lens sub-assemblies including a lens and a lens frame holding the lens; and a screw member screwed into the objective barrel, the screw member having an annular shape, the screw member pressing the plurality of lens sub-assemblies against the objective barrel along the optical axis direction of the objective, the screw member having six or more concave portions into which a jig is fitted when the screw member is screwed into the objective barrel, a number of the six or more concave portions being a multiple of three, and the six or more concave portions being provided at equal intervals in a circumferential direction of the screw member, and the method comprising:

(a) selecting a set of three concave portions into which three protrusions of a jig are fitted, from the six or more concave portions provided at equal intervals in the screw member included in the objective;

(b) screwing the screw member into the objective barrel included in the objective by the jig in which the three protrusions are fitted into the set of three concave portions selected in (a);

(c) measuring an optical performance of the objective after (b);

(d) repeating (a) through (c) at least once;

(e) determining one set from a plurality of sets, each set being a set of the three concave portions selected in (a), based on the optical performance measured in (c) performed at least twice; and (f) screwing the screw member into the objective barrel by the jig in which the three protrusions are fitted into the three concave portions included in the one set determined in (e).

2. The method according to claim 1, wherein at least one lens frame of a plurality of lens frames included in the plurality of lens sub-assemblies has:

an annular shape; and three protrusions provided, on an end surface in contact with another lens frame or the screw member, at equal intervals in a circumferential direction of the at least one lens frame.

3. The method according to claim 1, wherein a plurality of lenses included in the plurality of lens sub-assemblies includes at least one single lens that satisfies a following conditional expression:

$$0 < t_{min} / \varphi < 0.08$$

where $t_{min}$ is a thickness of a thinnest portion of the at least one single lens in the optical axis direction, and $\varphi$ is an outer diameter of the at least one single lens, and the single lens is disposed in an optical system without being cemented to another lens.

4. The method according to claim 1, wherein the objective is for a microscope, and the plurality of lens sub-assemblies include at least one cemented lens.

5. A method of assembling an objective, the objective comprising: an objective barrel; a plurality of lens sub-assemblies stacked in an optical axis direction of the objective in the objective barrel, each of the plurality of lens sub-assemblies including a lens and a lens frame holding the lens; and a screw member screwed into the objective barrel, the screw member having an annular shape, the screw member pressing the plurality of lens sub-assemblies against the objective barrel along the optical axis direction of the objective, the screw member having four or more concave portions into which a jig is fitted when the screw member is screwed into the objective barrel, and the four or more concave portions including four or more even-numbered concave portions provided at equal intervals in a circumferential direction of the screw member, and the method comprising:

(a) selecting a set of two concave portions into which two protrusions of a jig are fitted, from the four or more even-numbered concave portions provided at equal intervals in the screw member included in the objective;

(b) screwing the screw member into the objective barrel included in the objective by the jig in which the two protrusions are fitted into the set of the two concave portions selected in (a);

(c) measuring an optical performance of the objective after (b);

(d) repeating (a) through (c) at least once;

(e) determining one set from a plurality of sets, each set being a set of the two concave portions selected in (a), based on the optical performance measured in (c) performed at least twice; and (f) screwing the screw member into the objective barrel by the jig in which the two protrusions are fitted into the two concave portions included in the one set determined in (e).

6. The method according to claim 5, wherein at least one lens frame of a plurality of lens frames included in the plurality of lens sub-assemblies has:

an annular shape; and two protrusions provided, on an end surface in contact with another lens frame or the screw member, at equal intervals in a circumferential direction of the at least one lens frame.

7. The method according to claim 5, wherein a plurality of lenses included in the plurality of lens sub-assemblies includes at least one single lens that satisfies a following conditional expression:

$$0 < t_{min}/\varphi < 0.08$$

where $t_{min}$ is a thickness of a thinnest portion of the at least one single lens in the optical axis direction, and $\varphi$ is an outer diameter of the at least one single lens, and the single lens is disposed in an optical system without being cemented to another lens.

8. The method according to claim 5, wherein the objective is for a microscope, and the plurality of lens sub-assemblies include at least one cemented lens.

9. A method of assembling an objective, the objective comprising: an objective barrel; a plurality of lens sub-assemblies stacked in an optical axis direction of the objective in the objective barrel, each of the plurality of lens sub-assemblies including a lens and a lens frame holding the lens; and a screw member screwed into the objective barrel, the screw member having an annular shape, the screw member pressing the plurality of lens sub-assemblies against the objective barrel along the optical axis direction of the objective, the screw member having six or more concave portions into which a jig is fitted when the screw member is screwed into the objective barrel, a number of the six or more concave portions being a multiple of three, and the six or more concave portions being provided at equal intervals in a circumferential direction of the screw member, and the method comprising:

(a) selecting a set of three concave portions into which three protrusions of a jig are fitted, from the six or more concave portions provided at equal intervals in the screw member included in the objective;

(b) screwing the screw member into the objective barrel included in the objective by the jig in which the three protrusions are fitted into the set of three concave portions selected in (a);

(c) measuring an optical performance of the objective after (b);

(d) determining, based on the optical performance measured in (c), whether the objective satisfies a predetermined optical performance; and (e) if it is determined that the predetermined optical performance is not satisfied in (d), selecting a set of three concave portions different from the set of three concave portions and repeating (b), (c), and (d).

10. The method according to claim 9, wherein at least one lens frame of a plurality of lens frames included in the plurality of lens sub-assemblies has:

an annular shape; and three protrusions provided, on an end surface in contact with another lens frame or the screw member, at equal intervals in a circumferential direction of the at least one lens frame.

11. The method according to claim 9, wherein a plurality of lenses included in the plurality of lens sub-assemblies includes at least one single lens that satisfies a following conditional expression:

$$0 < t_{min}/\varphi < 0.08$$

where $t_{min}$ is a thickness of a thinnest portion of the at least one single lens in the optical axis direction, and $\varphi$ is an outer diameter of the at least one single lens, and the single lens is disposed in an optical system without being cemented to another lens.

12. The method according to claim 9, wherein the objective is for a microscope, and the plurality of lens sub-assemblies include at least one cemented lens.

13. A method of assembling an objective, the objective comprising: an objective barrel; a plurality of lens sub-assemblies stacked in an optical axis direction of the objective in the objective barrel, each of the plurality of lens sub-assemblies including a lens and a lens frame holding the lens; and a screw member screwed into the objective barrel, the screw member having an annular shape, the screw member pressing the plurality of lens sub-assemblies against the objective barrel along the optical axis direction of the objective, the screw member having four or more concave portions into which a jig is fitted when the screw member is screwed into the objective barrel, and the four or more concave portions including four or more even-numbered concave portions provided at equal intervals in a circumferential direction of the screw member, and the method comprising:

(a) selecting a set of two concave portions into which two protrusions of a jig are fitted, from the four or more even-numbered concave portions provided at equal intervals in the screw member included in the objective;

(b) screwing the screw member into the objective barrel included in the objective by the jig in which the two protrusions are fitted into the set of the two concave portions selected in (a);

(c) measuring an optical performance of the objective after (b);

(d) determining, based on the optical performance measured in (c), whether the objective satisfies a predetermined optical performance; and (e) if it is determined that the predetermined optical performance is not satisfied in (d), selecting a set of two concave portions different from the set of two concave portions and repeating (b), (c), and (d).

14. The method according to claim 13, wherein at least one lens frame of a plurality of lens frames included in the plurality of lens sub-assemblies has:

an annular shape; and two protrusions provided, on an end surface in contact with another lens frame or the screw member, at equal intervals in a circumferential direction of the at least one lens frame.

15. The method according to claim 13, wherein a plurality of lenses included in the plurality of lens sub-assemblies includes at least one single lens that satisfies a following conditional expression:

$$0 < t_{min}/\varphi < 0.08$$

where $t_{min}$ is a thickness of a thinnest portion of the at least one single lens in the optical axis direction, and $\varphi$ is an outer diameter of the at least one single lens, and the single lens is disposed in an optical system without being cemented to another lens.

16. The method according to claim 13, wherein the objective is for a microscope, and the plurality of lens sub-assemblies include at least one cemented lens.

* * * * *